(12) United States Patent
Dremel et al.

(10) Patent No.: US 8,449,353 B2
(45) Date of Patent: May 28, 2013

(54) HARD FINISH MACHINE FOR HARD FINISHING OF A WORKPIECE

(75) Inventors: Ralf Dremel, Lichtenfels (DE); Frank Mueller, Wiesenfeld (DE); Thomas Schenk, Coburg (DE)

(73) Assignee: Kapp GmbH, Berlin (DE)

( * ) Notice: Subject to any disclaimer, the term of this patent is extended or adjusted under 35 U.S.C. 154(b) by 394 days.

(21) Appl. No.: 12/894,268

(22) Filed: Sep. 30, 2010

(65) Prior Publication Data
US 2011/0081843 A1 Apr. 7, 2011

(30) Foreign Application Priority Data
Oct. 1, 2009 (DE) .................. 10 2009 043 676

(51) Int. Cl.
*B24B 7/00* (2006.01)
*B24B 55/02* (2006.01)

(52) U.S. Cl.
USPC ............... 451/66; 451/47; 451/53; 451/65; 451/253; 451/450

(58) Field of Classification Search
USPC ............ 409/66, 73, 78; 451/47, 53, 65, 66, 451/67, 253, 275, 449, 450
See application file for complete search history.

(56) References Cited

U.S. PATENT DOCUMENTS

| | | | |
|---|---|---|---|
| 3,905,161 A * | 9/1975 | Tomita et al. ........... | 451/11 |
| 4,314,425 A * | 2/1982 | Bricker et al. .......... | 451/450 |
| 4,961,289 A | 10/1990 | Sulzer | |
| 5,111,625 A * | 5/1992 | Simpfendorfer et al. .... | 451/450 |
| 5,882,247 A * | 3/1999 | Longuet et al. ........ | 451/236 |
| 6,123,606 A * | 9/2000 | Hill et al. ............ | 451/53 |
| 6,305,183 B1 * | 10/2001 | Mukai et al. ........... | 62/376 |
| 6,921,321 B2 * | 7/2005 | Morita ................ | 451/60 |
| 7,198,543 B2 * | 4/2007 | Yanase et al. ......... | 451/5 |

FOREIGN PATENT DOCUMENTS

| | | |
|---|---|---|
| DE | 92 03 125 | 4/1992 |
| DE | 299 00 753 U1 | 4/1999 |
| DE | 103 22 991 A1 | 12/2004 |
| DE | 10 2006 009 547 | 8/2007 |
| EP | 0 924 028 A2 | 6/1999 |
| JP | 11347934 A * | 12/1999 |

* cited by examiner

*Primary Examiner* — Timothy V Eley
(74) *Attorney, Agent, or Firm* — Lucas & Mercanti, LLP

(57) ABSTRACT

The invention relates to a hard finish machine (1) for hard finishing of a workpiece (2), comprising at least two different hard finish tools (3, 4) which are arranged on a tool spindle (5), wherein the tool spindle (5) is arranged movable in the direction (Y) of its axis (6) on a tool carrier (7), wherein the tool carrier (7) is translational movable relatively to a machine bed (8) and wherein the hard finish machine furthermore comprises cooling lubricant supplying means (9) for the supply of cooling lubricant to the machining region between the workpiece (2) and the hard finish tool (2, 3). To work in all possible tool and method combinations with optimized cooling lubricant supply conditions the invention proposes that the cooling lubricant supplying means (9) comprise at least a first cooling lubricant nozzle (9') having at least one opening for a stream of cooling lubricant and at least a second cooling lubricant nozzle (9") having at least one opening for a stream of cooling lubricant, wherein the two cooling lubricant nozzles (9', 9") are arranged movable relatively to another in the direction (Y) of the axis (6) of the tool spindle (5).

14 Claims, 2 Drawing Sheets

HARD FINISH MACHINE FOR HARD FINISHING OF A WORKPIECE

Figure 1:
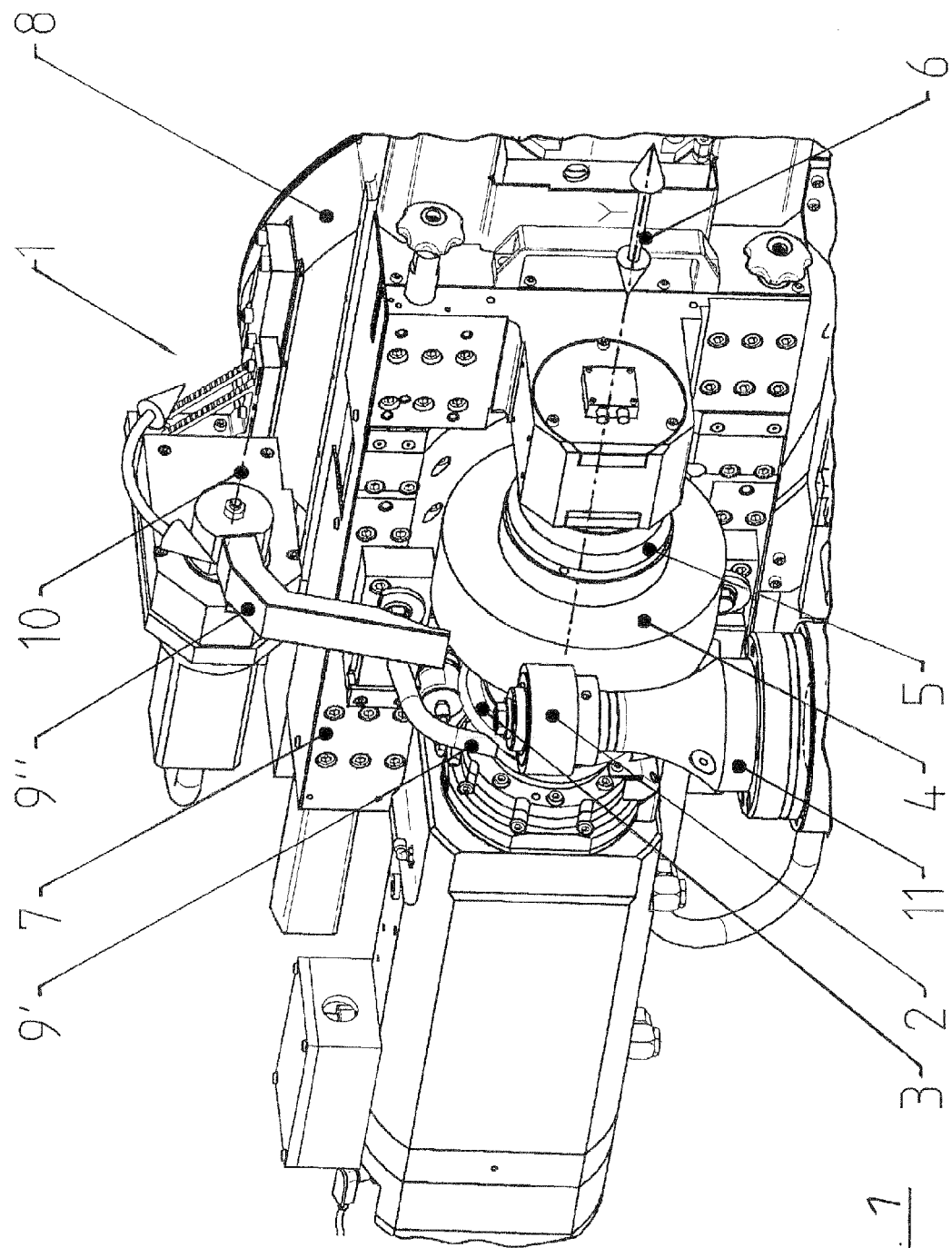

This application claims the priority of DE 10 2009 043 676.6 filed Oct. 1, 2009, which is incorporated by reference herein.

The invention relates to a hard finish machine for hard finishing of a workpiece, comprising at least two different hard finish tools which are arranged on a tool spindle, wherein the tool spindle is arranged movable in the direction of its axis on a tool carrier, wherein the tool carrier is translational movable relatively to a machine bed and wherein the hard finish machine furthermore comprises cooling lubricant supplying means for the supply of cooling lubricant to the machining region between the workpiece and the hard finish tool.

Such hard finish machines which are well known in the state of the art are employed e.g. in the production of gears as gear grinding machines. Often, a division of the stock is provided which has to be ground so that the gear is firstly rough machined and subsequently finish machined. For rough machining a grinding worm can be used, wherein the continuous generation grinding method is employed; the finish machining can take place with a profile grinding wheel using the profile grinding method.

In order to carry out the grinding process properly and to prevent especially thermal overload of the tooth flank a reliable supply of the contact area between the grinding tool and the workpiece must be ensured which takes place by the arrangement of cooling lubricant supply means.

For the two mentioned methods significant different demands with respect to the cooling lubricant supply exist in terms of a secure prevention of thermal damages of the workpiece:

When using the continuous generative grinding method usually cutting speeds, i.e. circumferential velocities of the grinding worm, of ca. 60 m/s and higher are used due to the connection between the cutting speed and the machining time. For a secure prevention of thermal damages of the workpiece peripheral zone a difference between the circumferential velocity of the grinding worm and the exit velocity of the stream of cooling lubricant being as small as possible is aimed for, i.e. a relatively high exit velocity of the cooling lubricant from the cooling lubricant nozzle is required. This high velocity is created by a small cross sectional area of the nozzle and a high supply pressure. Under such circumstances a relatively low volume flow rate is given which, however, has no negative influence to the grinding process or to the reached workpiece quality.

In contrast, when using the profile grinding method usually low cutting speeds between 25 and 35 m/s are employed. This method demands a secure coverage of the whole grinding wheel profile by the stream of cooling lubricant. Thereof the demand results for a relatively large cross sectional area of the nozzle depending on the respective profile width and height, wherein a stream of cooling lubricant having a low exit velocity and a low pressure results, but having a relatively high volume flow rate.

Beside the mentioned specific application of the hard finishing method of gears other general cases are possible in which several tools are employed one after the other with significant different demands to the cooling lubricant supply.

According to a usual manufacturing method in the case of several tools those tools are arranged flushing on a mandrel which is clamped between a spindle motor and a counter bearing. The whole unit consisting of spindle motor, counter bearing, mandrel and tools is arranged on a slide (tool carrier) movable in axial direction of the tools (mostly nominated as the "Y" axis) by which the tools can be brought into the axial position relatively to the workpiece which is necessary for the machining.

The worm-shaped tools which are used for the generative grinding process are usually significantly wider than the pure contact width which results from the contact between the tool and the workpiece. This is done for the purpose to use different shifting methods to grind the gears in a specific way: Firstly, the discontinuous shifting in the direction of the axis of the tool (Y axis) is employed between rough machining and finish machining and between the machining of single workpieces respectively to bring new fresh regions of the grinding worm into contact. With the continuous shifting in the direction of the axis of the tool (Y axis) during the grinding process of a workpiece (also designates as diagonal grinding) a specific influence of the tooth flank topology and/or surface structure can take place.

The cooling lubricant nozzles which are used here can be designed as fixed elements, i.e. they are optimized for a specific changeless workpiece diameter which is especially recommended for non-dressable CBN grinding tools which does not change their diameter. In the case of tools with changeable diameter, i.e. namely for dressable tools, the cooling lubricant nozzle can be installed in such a way that it is arranged movable in a plane which is perpendicular to the axis of the tool spindle, so that the cooling lubricant nozzle can be tracked correspondingly when the diameter of the tool decreases. This adjustment of the nozzle position to the actual tool diameter can take place by a rotatory or translational movement.

In the pre-known applications the workpiece is either machined only with a single tool (e.g. with a dressable grinding worm; the rough machining and the finish machining take place with different width regions of the same tool) or two tools of the same type and the same size are used (e.g. non-dressable profile grinding with CBN rough machining and finish machining wheels). In those cases the use of a single nozzle is possible without problems—with optimized properties for the used tool and method respectively.

Usually, a combination of several tools and machining methods of different kind respectively is used for the machining of several gears of the same workpiece in one clamping (e.g. gear box shafts) or for the machining of a gear with different methods for the rough machining and for the finish machining (e.g. rough machining by dressable generative grinding, finish machining by non-dressable profile grinding—as explained above).

In those cases the following variants of cooling lubricant supply are known:

It is known to use the same nozzle (with or without the above mentioned tracking in the case of changes of the diameter) for the different tools. Here it is the drawback that the conditions of the cooling lubricant supply cannot be optimized for each used tool. Therefore the machining with at least one of the used tools is possible only with reduced feed rate, so that longer machining times and thus a loss of efficiency result.

Furthermore, it is known that several nozzles are arranged on the slide of the Y axis which travel with the slide, wherein the nozzles do not change their position relatively to the respective tool. In this case the following drawbacks exist: To be able to use the above mentioned shifting process in the case of the generative grinding method with a worm-shaped tool the nozzle which travels with the slide of the Y axis must be as wide as the whole tool, i.e. thus significantly wider than it would be necessary due to the effective contact width between the tool and the workpiece. Given a constant exit height of the nozzle opening the cross sectional area of the nozzle increases when the nozzle becomes wider which is in conflict with the conditions which are ideal for the generative grinding. Also in this case the machining can take place only with a reduced feeding rate due to the non-optimal conditions of the cooling lubricant supply and thus the machining times are longer and the efficiency is reduced.

Thus, it is an object of the invention to further develop a hard finish machine of the kind mentioned above with respect to the cooling lubricant supply means so that the above mentioned drawbacks are avoided and that the use of all possible combinations of tools and methods can take place under optimized cooling lubricant supply conditions. It should become possible to adjust the respective conditions for the supply of cooling lubricant which have been found optimal for each type of tool and for each machining method. Furthermore, an automated adjusting of the conditions for the supply of cooling lubricant for a used tool and a used machining method respectively should become possible within a machining cycle without intervention by an operator, i.e. managed by the machine control.

The solution of this object by the invention is characterized in that the cooling lubricant supplying means comprise at least a first cooling lubricant nozzle having at least one opening for a stream of cooling lubricant and at least a second cooling lubricant nozzle having at least one opening for a stream of cooling lubricant, wherein the two cooling lubricant nozzles are arranged movable relatively to another in the direction of the axis of the tool spindle.

Thereby, it is preferred that the at least one first and the at least one second cooling lubricant nozzle are arranged movable in the direction of the axis of the tool spindle in such a way that the cooling lubricant nozzles can pass without collision so that especially each of the cooling lubricant nozzles can take the same position in the direction of the axis of the tool spindle.

The at least one first cooling lubricant nozzle is preferably arranged stationary at or on the tool carrier in the direction of the axis of the tool spindle.

Alternatively, it is also possible that the at least one first cooling lubricant nozzle is arranged movable on a linear guide relatively to the tool carrier in the direction of the axis of the tool spindle.

The second cooling lubricant nozzle is preferably arranged stationary at or on the machine bed in the direction of the axis of the tool spindle.

Also here it can be provided alternatively, that the second cooling lubricant nozzle is arranged movable on a linear guide relatively to the machine bed in the direction of the axis of the tool spindle.

At least one of the cooling lubricant nozzles can be arranged movable in a plane which is perpendicular to the axis of the tool spindle for adjusting to an optimal distance to the tool. For doing so, the cooling lubricant nozzle can be arranged rotatable around an axis which is parallel to the axis of the tool spindle. But it is also possible that the cooling lubricant nozzle is arranged translational (linear) movable in the plane which is perpendicular to the axis of the tool spindle.

Each of the cooling lubricant nozzles can be chargeable with cooling lubricant individually controlled; but it is also possible that all cooling lubricant nozzles are chargeable with cooling lubricant simultaneously.

The hard finish tools are preferably gear machining tools. A gear machining tool can be a grinding wheel, another tool can be a grinding worm. A specifically preferred embodiment proposes in that case that the first cooling lubricant nozzle is allocated to the grinding wheel and is arranged stationary at the tool carrier. The second cooling lubricant nozzle can be allocated to the grinding worm and can be arranged stationary at the machine bed in the direction of the axis of the tool carrier.

The second cooling lubricant nozzle can be arranged with a bigger distance from the axis of the tool spindle than the first cooling lubricant nozzle—seen in the direction of the axis. This facilitates or allows the collision-free passing of the cooling lubricant nozzles in the Y direction.

Thus it is proposes the combination of several nozzles, wherein preferably at least one is movable in the direction of the axis of the tool and at least one is stationary in the direction of the axis of the tool. Both nozzles can have a possibility for adjustment in the plane which is perpendicular to the axis of the tool spindle. Here, it is provided that the design of the nozzle is chosen in that way that a simultaneous and collision-free positioning of both nozzles is possible in each working position what is specifically easy to do in the case of big differences in the diameter of the used tools. Several nozzles can thus carry out a movement in the direction of the axis of the tool (e.g. travelling with the slide of the Y axis) in such a way that the nozzles can be brought simultaneously in the same orthogonal plane to the tool axis.

In the case that the nozzle is movable in the plane which is perpendicular to the axis of the tool spindle (rotatory or translational) especially a device for tracking of the changing grinding tool diameter can be employed. If such movable (adjustable) nozzles are used there is the possibility that the movable nozzle is moved out of the collision region by means of the adjustment device prior the passing of the nozzles (in direction of the Y axis) so that the passing of the nozzles can take place without difficulties, i.e. before the movable nozzle, which is movable in the direction of the axis of the tool, together with the respective tool is brought into working position.

The cooling lubricant nozzles can have more than one nozzle channel for cooling lubricant, i.e. more than one exit openings. It is possible that in one nozzle body several of such nozzle channels are arranged which can be specifically charged with cooling lubricant. It is also possible that the cooling lubricant nozzles are designed as dual or multiple nozzles, wherein then several nozzle bodies are fixed with another which are specifically charged with cooling lubricant respectively. In all of those cases the nozzles can thus be charged simultaneously or isolated from another with cooling lubricant.

Beneficially, the above mentioned object is solved completely with the proposed solution. Accordingly, it becomes possible that also in the case of the use of very different hard finish tools, especially of grinding tools, the cooling lubricant supply conditions are optimized. The adjustment of the cooling lubricant supply means is possible in an easy manner automated by means of the machine control unit.

Consequently, solutions are proposed for the cooling lubricant supply for machining methods in which several tools are used one after the other in the same position relatively to the workpiece to be machined and wherein the requirements for the cooling lubricant supply (especially in terms of the exit cross sectional area, the exit speed, the volume flow rate and the pressure) differ significantly depending on the used tools and machining methods.

In the drawing an embodiment of the invention is shown.

Figure 2:
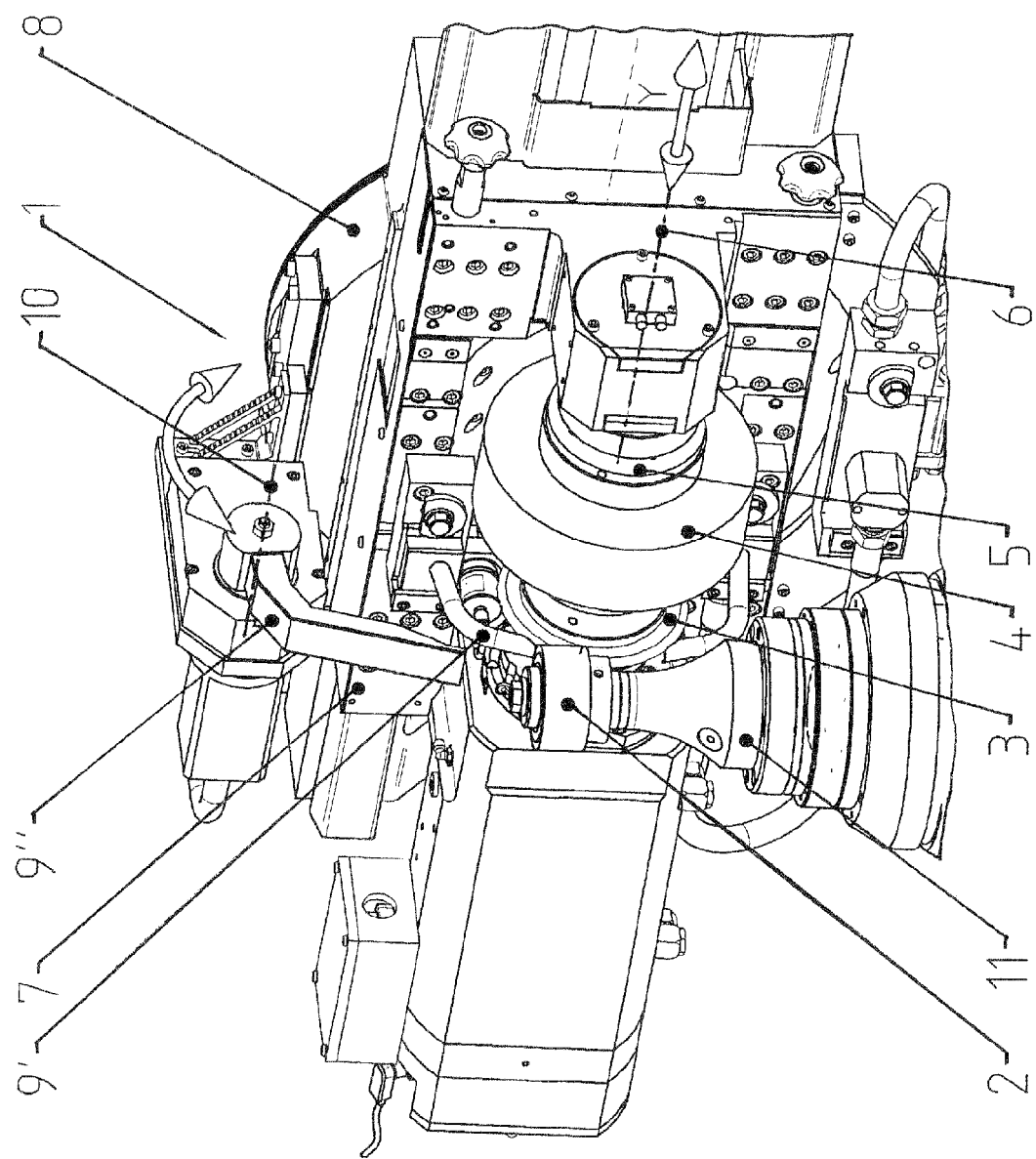

FIG. 1 shows in a perspective view a hard finish machine being designed as gear grinding machine, which has a grinding wheel and a grinding worm as grinding tools which are supplied with cooling lubricant by respective cooling lubricant nozzles, wherein the grinding with the grinding worm is depicted, and FIG. 2 shows the gear grinding machine according to FIG. 1, wherein the grinding with the grinding wheel is depicted.

In the figures a hard finish machine 1 being a gear grinding machine is depicted which has a machine bed (machine base frame) 8. Inter alia, a tool carrier (slide) 7 is arranged linear movable on the same which bears a tool spindle 5. On the tool spindle 4 at least two hard finish tools 3, 4 are arranged, namely a profile grinding wheel 3 and a grinding worm 4 being depicted only schematically, wherein the tool spindle 5 can be designed as a one-part spindle or can consist of two or more separate spindles which can also be driven separately. The workpiece 2 which is to be machined with the tools 3, 4 is clamped on a workpiece spindle 11; presently, the workpiece axis is oriented vertically.

The tool spindle 5 has an axis 6. The tool spindle 5 can be moved in the direction of this axis on the tool carrier 7 in the marked direction Y to bring the tools 3, 4 selectively into engagement with the workpiece 2. Insofar, the gear grinding machine corresponds to the pre-known designs. The further necessary machine axes which are of course necessary for the machining are not further discussed as they are not relevant for the invention.

Relevant are now the cooling lubricant supply means which consist of the two cooling lubricant nozzles 9' and 9" in the shown embodiment.

The first cooling lubricant nozzle 9' is here fixed stationary at the tool carrier 7 in such a way that it can supply the grinding wheel 3 optimal with cooling lubricant. Reference is made to the above remarks concerning the design of the nozzle in the case of the profile grinding method and the operation parameters which are aimed in this case.

However, the second cooling lubricant nozzle 9" is (directly or indirectly) arranged stationary at the machine bed 8, i.e. it is absolutely stationary. It is designed as a flat slit nozzle so that it can supply the grinding worm 4 optimal with cooling lubricant. Also here reference is made to the above remarks concerning the optimal design and operation mode of a nozzle in the case of the gear grinding with a grinding worm.

It can be seen in FIG. 1 how the workpiece 2 is rough machined with the grinding worm 4. The tool spindle 5 is moved in the direction of the axis Y into the respective position. The second cooling lubricant nozzle 9" is activated, the first cooling lubricant nozzle 9' is switched off.

It should be mentioned that a dressable grinding worm 4 is used in the present case which is dressed periodically by means of a dressing device which is not depicted. Accordingly, the grinding worm diameter changes gradually so that the second cooling lubricant nozzle 9" must be tracked for ensuring that always optimal lubrication conditions are maintained. Therefore, the second cooling lubricant nozzle 9" is pivotable arranged around an axis 10, wherein the axis 10 is parallel to the axis 6. By swivelling of the cooling lubricant nozzle 9" the distance between the nozzle exit and the grinding worm surface can thus be kept constant.

In FIG. 2 it can be seen that the tool spindle 5 was moved in the direction Y to bring the workpiece 2 and the grinding wheel 3 into engagement for finish machining. Accordingly, now the cooling lubricant nozzle 9' is activated while the cooling lubricant nozzle 9" is switched off.

As can be seen the grinding wheel 3 has a smaller outer diameter than the grinding worm 4 in the present case. Accordingly, also the cooling lubricant nozzle 9' is arranged closer to the axis 6 of the tool spindle 5 than the cooling lubricant nozzle 9".

This abets that the two cooling lubricant nozzles 9' and 9" can pass each other without collision when the tool spindle 5 is moved in direction Y. For this purpose the swivelling around the axis 10 is changed if applicable to ensure the collision-free passing of the two nozzles 9', 9". This can take place automatically by means of the machine control unit.

As far as above an (absolute) stationary arrangement of the nozzle at or on the machine bed is mentioned the following should be noted: On the actual machine bed mostly a machine stand is (movably) arranged, wherein in turn a swivelling part is arranged (movably) on the machine stand. Then, e.g. a slide is arranged movably on a linear guide (for the Y axis) on the swivelling part.

The stationary arrangement of the nozzle at or on the machine bed has to be understood in that way that the nozzle is not moved during the intended use during the grinding process. Thus, this is also the case by definition if the nozzle—as it may be mostly the case—is fixed on the swivelling part and thus not directly fixed, but indirectly fixed via the swivelling part and the machine stand with the machine bed so that however the nozzle is arranged stationary relatively to the bed during the intended use (although it can be moved (adjusted) by the swivelling part and the machine stand relatively to the actual machine bed).

LIST OF REFERENCE NUMERALS

1 Hard Finish Machine
2 Workpiece
3 Hard Finish Tool (grinding tool)
4 Hard Finish Tool (grinding worm)
5 Tool Spindle
6 Axis
7 Tool Carrier
8 Machine Bed (machine base frame)
9 Cooling Lubricant Supplying Means
9' First Cooling Lubricant Nozzle
9" Second Cooling Lubricant Nozzle
10 Axis
11 Workpiece Spindle
Y Direction of the Axis of the Tool Spindle

The invention claimed is:

1. A hard finish machine for hard finishing of a workpiece, comprising:
    at least two different hard finish tools which are arranged on a tool spindle, wherein the tool spindle is arranged movable in a direction of an axis of the tool spindle, on a tool carrier;
    the tool carrier is translationally movable relative to a machine bed;
    a cooling lubricant supplying means for a supply of cooling lubricant to a machining region between the workpiece and the hard finish tools;
    the cooling lubricant supplying means comprise at least one first cooling lubricant nozzle having at least one opening for a stream of cooling lubricant and at least one second cooling lubricant nozzle having at least one opening for a stream of cooling lubricant; and
    the cooling lubricant nozzles are arranged movable relative to one another in the direction of the axis of the tool spindle in such a way that the cooling lubricant nozzles can pass each other in the direction of the axis of the tool spindle without collision and each of the cooling lubricant nozzles can occupy an identical plane which is perpendicular to the axis of the tool spindle.

2. The hard finish machine according to claim 1, wherein the at least one first cooling lubricant nozzle is arranged stationary at or on the tool carrier in the direction of the axis of the tool spindle.

3. The hard finish machine according to claim 1, wherein the at least one first cooling lubricant nozzle is arranged movable on a linear guide relatively to the tool carrier in the direction of the axis of the tool spindle.

4. The hard finish machine according to claim 1, wherein the at least one second cooling lubricant nozzle is arranged stationary at or on the machine bed in the direction of the axis of the tool spindle.

5. The hard finish machine according to claim 1, wherein the at least one second cooling lubricant nozzle is arranged movable on a linear guide relatively to the machine bed in the direction of the axis of the tool spindle.

6. The hard finish machine according to claim 1, wherein at least one of the cooling lubricant nozzles is arranged movable in a plane which is perpendicular to the axis of the tool spindle.

7. The hard finish machine according to claim 6, wherein the at least one of the cooling lubricant nozzles is arranged rotatable around an axis which is parallel to the axis of the tool spindle.

8. The hard finish machine according to claim 6, wherein the at least one of the cooling lubricant nozzles is arranged translationally movable in a plane which is perpendicular to the axis of the tool spindle.

9. The hard finish machine according to claim 1, wherein an amount of cooling lubricant supplied to either of cooling lubricant nozzles is controlled independently.

10. The hard finish machine according to claim 1, wherein all of the cooling lubricant nozzles are chargeable with cooling lubricant simultaneously.

11. The hard finish machine according to claim 1, wherein the hard finish tools are gear machining tools, and wherein one of the gear machining tools is a grinding wheel and a another of the gear machining tools is a grinding worm.

12. The hard finish machine according to claim 11, wherein the at least one first cooling lubricant nozzle is allocated to the grinding wheel and is arranged stationary at the tool carrier.

13. The hard finish machine according to claim 11, wherein the at least one second cooling lubricant nozzle is allocated to the grinding worm and is arranged stationary at the machine bed in the direction of the axis of the tool carrier.

14. The hard finish machine according to claim 11, wherein the second cooling lubricant nozzle is arranged with a bigger distance from the axis of the tool spindle than the at least one first cooling lubricant nozzle seen in the direction of the axis.

* * * * *

UNITED STATES PATENT AND TRADEMARK OFFICE
CERTIFICATE OF CORRECTION

PATENT NO. : 8,449,353 B2  
APPLICATION NO. : 12/894268  
DATED : May 28, 2013  
INVENTOR(S) : Dremel et al.

Page 1 of 1

It is certified that error appears in the above-identified patent and that said Letters Patent is hereby corrected as shown below:

On the title page item (73), should read:   Kapp GmbH, Coburg (DE)  
                                            Niles Werkzeugmaschinen GmbH, Berlin (DE)

Signed and Sealed this  
Sixth Day of August, 2013

Teresa Stanek Rea  
*Acting Director of the United States Patent and Trademark Office*